March 18, 1930. H. SAUVEUR 1,750,818
MEANS FOR PREVENTING LEAKAGE
Filed Aug. 15, 1927  2 Sheets-Sheet 2
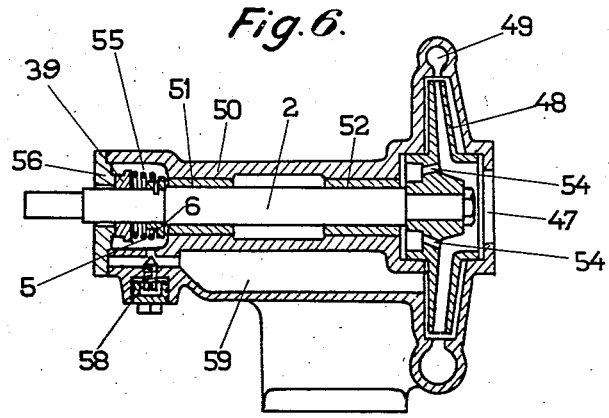
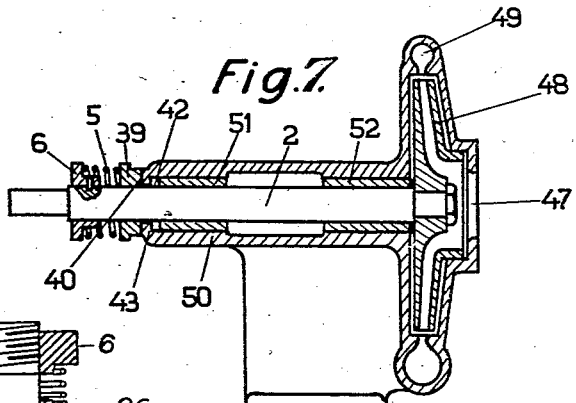
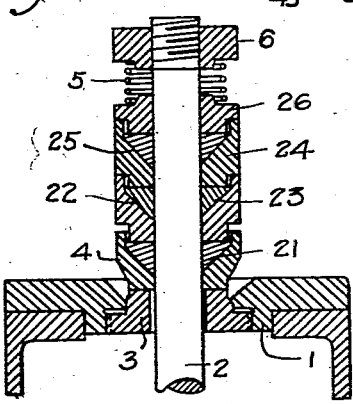
Inventor
Harry Sauveur
by Dodge and Sons
Attorneys Patented Mar. 18, 1930

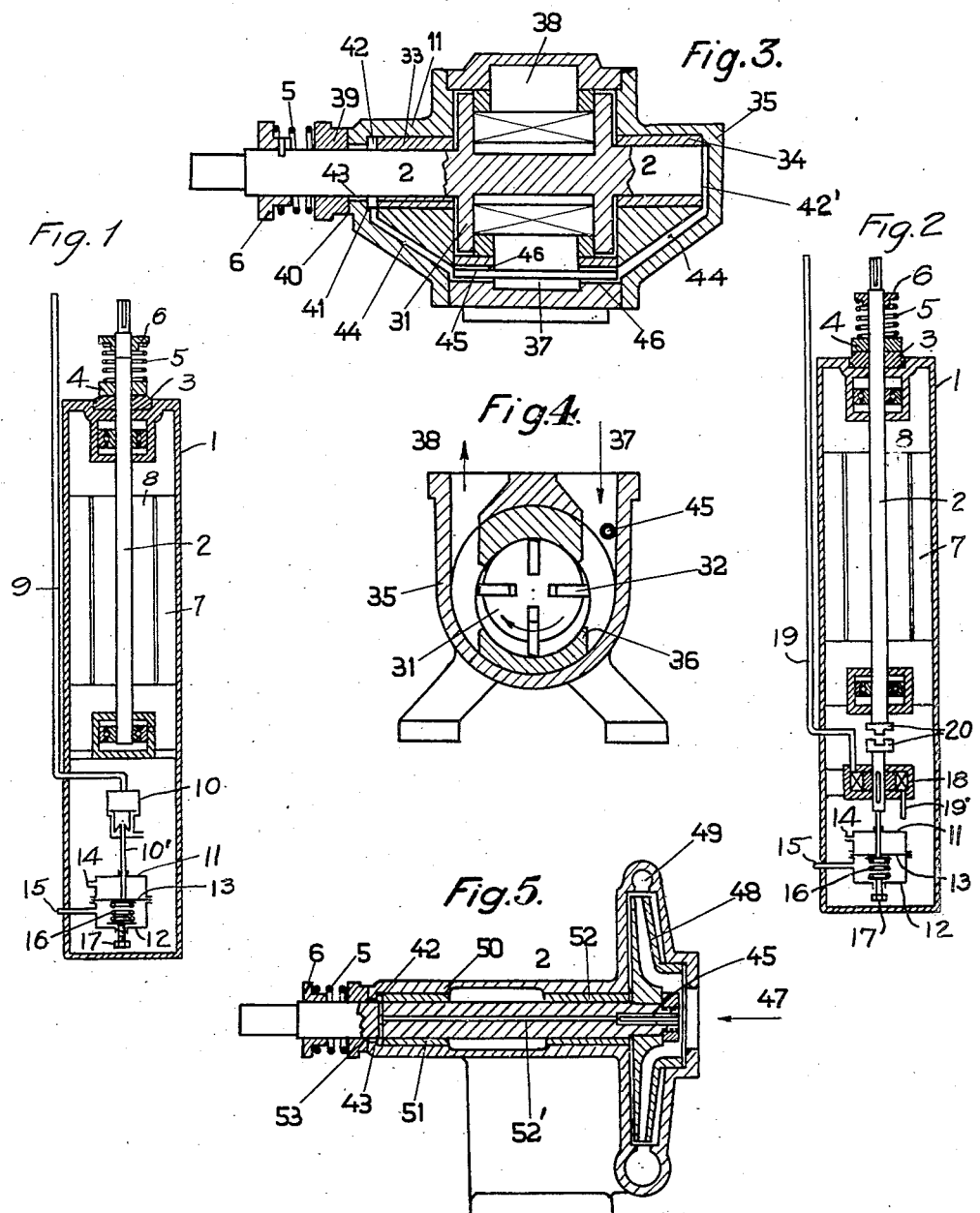

1,750,818

UNITED STATES PATENT OFFICE

HARRY SAUVEUR, OF HANOVER, GERMANY

MEANS FOR PREVENTING LEAKAGE

Application filed August 15, 1927, Serial No. 213,180, and in Germany August 12, 1926.

My invention relates to means for preventing access of a liquid or fluid to machine casings and particularly to the casings of high-speed machines, as electric motors filled with a fluid under pressure, and it is an object of my invention to provide means which will operate without supervision for indefinite periods after they have been regulated for given conditions.

To this end, I provide at the point where a shaft projects from the casing, a floating packing member which is subjected to the resultant of the ambient pressure, an additional load to the ambient pressure, and the pressure in the casing. The sum of the ambient pressure plus the load is somewhat in excess of the inside pressure which tends to lift the member from its seat and is counteracted by the ambient pressure and the load. The resultant pressure at the faces of the packing member and the seat, where the parts are in contact, is only moderate so that excessive friction, wear, heating and seizing are eliminated.

It is another object of my invention to provide means for maintaining within the casing, or in a space adjacent the packing means, a pressure which is only slightly in excess of the ambient pressure so that a small additional load will be sufficient for maintaining the packing means effective.

It has already been proposed, for instance in steam turbines, to provide packing means comprising a stationary and a rotary washer but in these constructions the contact faces where under the pressure within the casing and of an additional load so that the excess of pressure over the ambient, generally atmospheric, pressure, was very considerable and this high resultant pressure caused friction, wear, and seizing, so that the packing means had to be lubricated very thoroughly and be kept under constant supervision.

In a preferred embodiment of my invention, I provide regulating means for maintaining the pressure within the casing, or in a space adjacent the packing means, at a predetermined, and preferably slight, excess over the ambient pressure, and I provide means, such as a spring, for exerting the required additional load on the packing faces.

My invention may be applied to any type of machinery, engines, motors, pumps and the like, but, as mentioned, is particularly suitable for high speed machines, and it has been found that packing means according to my invention may be operated for months at a time at very high speeds, as for instance 3000 revolutions per minute, without requiring any attention and practically without wear.

The casing of the machine, or a chamber in the casing adjacent the packing means, is held under a pressure which is somewhat in excess of the pressure of the ambient medium and two packing washers are provided where any part, as for instance a shaft, projects from the casing. One of the washers is stationary and secured to the casing, and the other rotates with the shaft, and the additional load aforesaid exerts pressure on the two washers.

It is understoood that I am not limited to this particular type of packing means as my invention may be adapted to other packings and to parts other than a shaft, without departing from the spirit of the invention.

The problem underlying my invention cannot be solved by maintaining the pressure in the casing constant and at a given excess over a certain amount of the ambient pressure wherever that pressure is variable, for obviously the pressure in the casing might then become less than the ambient pressure and liquid or fluid would penetrate into the casing. Nor can the problem be solved by maintaining in the casing a pressure which is in excess of the maximum ambient pressure that may occur, for with the ambient pressure at its normal value, the leakage from the casing will be considerable, causing loss of medium from the casing and, where the ambient medium is a liquid, as in the case of a submerged pump, surging and bubbling of the liquid. It is also possible that the medium leaking from the casing exerts a detrimental action on the ambient medium.

Therefore, instead of maintaining the pressure constant in the casing, I prefer to maintain the resultant pressure constant, that is, to regulate the pressure in the casing—or the chamber adjacent the packing—so that it varies with the ambient pressure but it is permanently at a given, and constant excess pressure over the pressure of the ambient medium.

In the accompanying drawings, various types of machinery to which my packing is applied, and various types of packing, are illustrated diagrammatically by way of example.

In the drawings:

Figures 1 and 2 are axial sections of motor casings equipped with my packing and with means for regulating the pressure in the casing in proportion to the ambient pressure, Figs. 3 and 4 are axial and transverse sections, respectively, of a vane pump, Figs. 5, 6 and 7 are longitudinal sections of centrifugal pumps, all equipped with my packing, Fig. 8 is an axial section, on a larger scale, of a particular type of packing according to my invention.

In all of the examples illustrated, the pressure in the casing is higher than the ambient pressure.

Referring now to Figs. 1 and 2, 1 is a casing of an electromotor for driving a submerged pump, 2 is the shaft, 8 is the rotor and 7 is the stator of an electric motor in the casing 1, 3 is one of the packing washers which is secured to the casing 1, 4 is the mating washer which is secured on and rotates with the shaft 2, 5 is a spring on the end of the shaft 2 which exerts pressure on the packing washers 3 and 4, and 6 is a nut for regulating the tension of the spring 5.

Referring now particularly to Fig. 1, 9 is a pipe through which a medium under pressure, as for instance compressed air, is supplied to the casing 10 of a valve in the motor casing 1, and 11 is the casing of a regulator for the valve in the casing 10. 13 is a diaphragm at the bottom of the casing 11, 12 is a casing secured to the casing 11 so that the diaphragm is between the two, 16 is a spring inserted between the bottom of the casing 12 and the diaphragm 13, and 17 is a screw for regulating the tension of the spring.

The valve casing 10 is provided with a discharge pipe toward the interior of the casing 1, 14 is a pipe connecting the upper casing 11 of the regulator with the interior of the casing 1, and 15 is a pipe connecting the ambient liquid, for instance oil in a deep well, with the lower casing 12.

With the diaphragm 13 in its normal position the valve in the casing 10 is closed. The diaphragm 13 assumes this position when the pressure in the casing 1 is equal to the pressure of the ambient medium plus the pressure of the spring 16. When the pressure in the casing 1 falls below this value, the pressure in the casing 12 plus the pressure of the spring 16 will overcome that in the casing 11, the diaphragm 13 will bend upwards and open the valve in the casing 10 which in turn admits compressed air from the pipe 9 to the interior of the casing 1 until equilibrium has been reestablished.

The apparatus illustrated in Fig. 2 is similar to the one described, with the difference that instead of the valve casing 10 which is supplied with compressed air, a compressor 18 is provided, the shaft 18' of which is provided with a clutch 20 adapted to engage the motor shaft $a$ and is adapted to be raised or lowered under the control of the regulator diaphragm 13 moving up and down as described with reference to Fig. 1. When the diaphragm 13 bends upwards on account of a reduction of the pressure in the casing 11 which in turn is caused by a reduction of pressure in the casing 1, the clutch 20 is thrown in and the compressor 18 draws air through its suction pipe 19 and delivers it into the casing 1 through its delivery pipe 19'.

In the examples described two cooperating washers are illustrated, one of which, 3, is secured to the casing 1 and may be of cast iron, while the other, 4, which may be of carbon, rotates with the shaft. Examples will now be described in which the rotary washer is applied directly to the casing and not to a mating washer. These examples will also serve for illustrating the alternative referred to above, viz, the regulation of the pressure in a space adjacent the packing means. The regulation may be effected, for instance, by connecting this space with the suction and delivery sides of a pump, and throttling the flow of the medium in such connection.

Referring first to Figs. 3 and 4, 2 is the shaft of a vane pump on which a rotor 31 with vanes 32 is formed, 33 and 34 are bearings for the shaft in the casing 35 of the pump, 36 is the usual eccentric sleeve on which the vanes 32 slide, 37 is the suction, and 38 is the delivery passage of the pump.

39 is a rotary packing washer on the shaft 2 which fits tightly on the shaft but partakes in its rotation, being entrained by the spring 5, or other suitable means, and 6 is the nut for regulating the spring pressure, as described. 40 is a face at the end of the casing on which the washer 39 is ground to a tight fit, 42 and 43 are annular passages making up the space adjacent the packing, as referred to above, and 41 is a very fine groove in the brass of the bearing 33 which connects the space with the delivery side of the pump. The suction side of the pump is connected with the space by a passage 44 in the casing and a passage 5 in the sleeve 36 which opens into the suction passage 37, and 46', 44' are corresponding passages to connect a chamber 42' at the rear end of the shaft 2 with the passage 37. 45 is a core inserted in the passages 46 and 46′ to vary the free area of the passages.

The medium from the delivery side of the pump flows to the space 42 and 43 through the groove 41 and to the suction passage 37 through the passages 44 and 46, and the rate at which such flow occurs, and consequently the pressure on the inner face of the washer 39, is a function of the free area of the passage 46 which is varied by varying the diameter ratio of the passage 46 and the core 45. The pressure on the washer 39 will be high when the free passage is small, and small when the passage is high.

Instead of a groove 41, the bearing brass 33 may be made with a small clearance with respect to the shaft 2.

By suitably selecting the several areas and clearances, and by suitable adjustment, the forces acting on the washer 39 are readily balanced so as to obtain a tight fit of the washer on the face 40 without undue friction and wear. Any wear that may occur is made up for by the spring 5. The packing will operate for a long period without readjusting, and is particularly suitable where the ratio of inside and ambient pressure is a constant.

Fig. 5 shows a similar packing applied to a centrifugal pump. 47 is the suction passage, 48 is the rotor on the shaft 2, 49 is the casing of the rotor, 50 is a sleeve integral with the casing, 51 and 52 are bearings in the sleeve which have some clearance with respect to the shaft 2 so that the medium under pressure from the delivery side of the pump is able to leak to the space 42 and 43, 53 is a transverse bore in the shaft, 52′ is an axial bore in the shaft connected with the transverse bore, and 45 is a core inserted at the end of the bore where it opens into the suction space 47. The bearings 51 and 52 may be grooved instead of having a clearance. The operation is the same as described with reference to Figs. 3 and 4.

Fig. 6 shows an arrangement, by way of example in a centrifugal pump, which is the reverse of that described with reference to the previous figures in that here the space 55 which corresponds to the space 42 and 43 in Figs. 3 and 4, is connected with the suction side of the pump through clearances or grooves of the bearings 51 and 52, and with its delivery side through a separate passage 59. 54 are ports in the rotor 48 by which the suction side 47 is connected with the bearings 51 and 52. The space 55 is closed by a cover 56 at the end of the sleeve 50, and the washer 39 is ground to the cover and held against it by the spring 5 and the nut 6, as described. It will appear that in this instance the position of the washer 39 is reversed as compared with the previous examples. 58 is a threaded pin for regulating the area of the connection between 59 and 55. The pressure in the chamber 55 and the pressure of the spring 5 are so adjusted that leakage of the ambient medium, which may be atmospheric air, into the space 55 is prevented.

The pump illustrated in Fig. 7 is similar to that in Fig. 5 but the connection 52′ and 53 with the suction side 47 is dispensed with and the resistance in the bearings 51 and 52 is relied on to reduce the pressure of the medium on the delivery side, and in the space 42 and 43.

It will be understood that in all cases described, the contact pressure of the packing washers, or the washer on the casing or a part secured thereto, as the case may be, is regulated by adjusting the nut 6 of the spring 5 in accordance with the ratio of the inside and ambient pressures so that a small resultant force is obtained which holds the packing tight without causing undue friction and wear.

Referring now to Fig. 8, this shows a more elaborate packing which is adapted to operate under particularly exacting conditions as in deep-well pumps. In these pumps which often operate for months below the liquid level where inspection is impossible, it is not only necessary to make up for wear by automatic means but also to provide for the elimination of friction and seizing notwithstanding the small size of the parts as necessitated by the restricted space available. Friction is particularly serious as in very deep wells the temperature is often so high that any increase of the heat by friction may become disastrous.

For these reasons, a stuffing box is combined with the packing washers 3 and 4. The washer 4 is cup-shaped and a conical packing ring 21 which may be of resilient material, is inserted in the cup. Two more cups 22 and 24, with conical packing rings 23 and 25, are arranged on top of the cup 4, each cup exerting pressure on the ring below, under the action of the spring 5 which is supported on a washer 26 at its lower end, and abuts against the nut 6 at its upper end. The pressure of the spring not only holds tight at the packings of the stuffing box and at the contact faces of the washers 3, 4 but also makes up for wear.

I claim as my invention:

1. In a high-speed machine comprising a casing filled with a fluid under pressure and having an aperture therein, a shaft extending through said aperture and into said casing, packing means on said casing and around said shaft comprising a rotatable packing member which is subjected to the combined action of the pressures within and without said casing, a stationary packing member around said shaft, the pressure outside the casing tending to press one member against the other member, means for applying an additional pressure on said rotatable member which tends to hold it engaged with said stationary member against a surplus of the pressure within said casing, and means for maintaining a pressure within said casing to a value somewhat in excess of the outside pressure.

2. In a high-speed machine comprising a casing having an aperture therein, a shaft extending through said aperture and into said casing, packing means on said casing and around said shaft comprising a rotatable packing member which is subjected to the combined action of the pressures within and without said casing, a stationary packing member around said shaft, the pressure outside the casing tending to press one member against the other member, means for applying an additional pressure on said rotatable member which tends to hold it engaged with said stationary member against a surplus of the pressure within said casing, means for supplying a fluid under pressure to said casing, a regulator in said casing, and means operatively connected with said regulator for controlling the admission of said fluid to the inside of said casing.

3. In a high-speed machine comprising a casing having an aperture therein, a shaft extending through said aperture and into said casing, packing means on said casing and around said shaft comprising a rotatable packing member which is subjected to the combined action of the pressures within and without said casing, a stationary packing member around said shaft, the pressure outside the casing tending to press one member against the other member, means for applying an additional pressure on said rotatable member which tends to hold it engaged with said stationary member against a surplus of the pressure within said casing, means for supplying a fluid under pressure to said casing, a regulator in said casing, a diaphragm in said regulator one side of which is exposed to the pressure inside the casing, the other side of which is exposed to the pressure outside said casing, means operatively connected with said diaphragm for controlling the admission of the fluid to the inside of said casing, and means for applying a load on said diaphragm additional to the outside pressure.

4. In a high-speed machine comprising a casing having an aperture therein, a shaft extending through said aperture and into said casing, packing means on said casing and around said shaft comprising a rotatable packing member which is subjected to the combined action of the pressures within and without said casing, a stationary packing member, the pressure outside the casing tending to press one member against the other member, means for applying an additional pressure on said rotatable packing member which tends to hold it engaged with said stationary member against a surplus of the pressure within said casing, a compressor adapted to be operated by said machine and to deliver fluid under pressure to the inside of said casing, a regulator in said casing, and means connected with said regulator for controlling operative connection of said compressor and said machine.

In testimony whereof, I have signed my name to this specification.

HARRY SAUVEUR.